(12) United States Patent
Ferrer (10) Patent No.: US 10,434,837 B2
(45) Date of Patent: Oct. 8, 2019

(54) RIB SEAL ON FRONT OF DASH SEAL

(71) Applicant: Hanon Systems, Daejeon (KR)

(72) Inventor: Jhonatan Ferrer, Ann Arbor, MI (US)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 15/718,625

(22) Filed: Sep. 28, 2017

(65) Prior Publication Data

US 2019/0092124 A1 Mar. 28, 2019

(51) Int. Cl.
*F16L 5/02* (2006.01)
*B60H 1/00* (2006.01)
*F16L 5/10* (2006.01)

(52) U.S. Cl.
CPC ............ *B60H 1/00521* (2013.01); *F16L 5/02* (2013.01); *B60H 1/00571* (2013.01); *B60H 2001/00635* (2013.01); *F16L 5/10* (2013.01)

(58) Field of Classification Search
CPC ...... F16J 15/32; F16J 15/34; F16J 5/00; F16J 5/022; F16J 5/025; F16J 5/027; F16J 5/06; F16J 5/061; F16J 5/064; F16J 5/10; F16J 5/104; F16J 5/106; F16L 5/00; F16L 5/022; F16L 5/025; F16L 5/027; F16L 5/06; F16L 5/061; F16L 5/064; F16L 5/10; F16L 5/104; F16L 5/106; F16L 5/02
See application file for complete search history.

(56) References Cited

U.S. PATENT DOCUMENTS

| | | | | |
|---|---|---|---|---|
| 4,868,957 A * | 9/1989 | Rojdev | .................. | A61G 17/02 27/17 |
| 2005/0115532 A1* | 6/2005 | Schueren | ............... | F02F 11/002 123/90.37 |
| 2007/0068154 A1* | 3/2007 | Bernadat | ............... | B60T 11/232 60/562 |
| 2007/0132194 A1* | 6/2007 | Kanda | .................... | F16J 15/322 277/559 |
| 2007/0222157 A1* | 9/2007 | Kondo | ................. | F02M 59/442 277/345 |
| 2007/0241515 A1* | 10/2007 | Sato | .......................... | F16F 9/36 277/549 |
| 2011/0260447 A1* | 10/2011 | Duval-Arnould | ...... | B60K 15/03 285/220 |

(Continued)

FOREIGN PATENT DOCUMENTS

JP 2001026213 A 1/2001

*Primary Examiner* — Kristina R Fulton
*Assistant Examiner* — L. Susmitha Koneru
(74) *Attorney, Agent, or Firm* — Shumaker, Loop & Kendrick, LLP; James D. Miller (57) ABSTRACT

A seal assembly for an air handling system of a motor vehicle comprises a panel having a surface disposed on a first plane, a plurality of spaced apart ribs with an end of each of the ribs disposed on a second plane, and a sealing structure having a first face in facing relationship with the surface of the panel and an opposing second face in facing relationship with the plurality of the spaced apart ribs. The first face includes a first projection projecting therefrom including a first sealing surface spaced apart from the second face of the main body by a first distance and second projection projecting away from the first sealing surface of the first projection and including a second sealing surface spaced apart from the second face of the main body by a second distance greater than the first distance.

19 Claims, 4 Drawing Sheets

(56) References Cited

U.S. PATENT DOCUMENTS

| | | | |
|---|---|---|---|
| 2012/0228829 A1* | 9/2012 | Sedlar | F16J 15/3224 277/309 |
| 2013/0074793 A1* | 3/2013 | Washino | F01L 1/344 123/90.17 |
| 2013/0127118 A1* | 5/2013 | Sedlar | F16J 15/3224 277/309 |
| 2014/0084548 A1* | 3/2014 | Kostron | F16J 15/34 277/500 |
| 2017/0321830 A1* | 11/2017 | Bareis | F16J 15/025 |
| 2018/0073235 A1* | 3/2018 | McFarland | F16J 15/024 |
| 2018/0245558 A1* | 8/2018 | Eck | F02M 55/004 |

* cited by examiner

RIB SEAL ON FRONT OF DASH SEAL

FIELD OF THE INVENTION

The invention relates generally to a heating, ventilating, and air conditioning (HVAC) air handling system for a motor vehicle, and more particularly, to a sealing structure of the HVAC air handling system configured to receive fluid lines for communicating a fluid between an interior and an exterior of a housing of the HVAC air handling system.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air handling system. The air handling system conditions air flowing therethrough and distributes the conditioned air throughout the passenger compartment.

The air handling system commonly employs a housing including one or more heat exchangers for conditioning the air passing through the air handling system. The air handling system may for example include an evaporator associated with a refrigeration circuit of the air handling system for cooling and dehumidifying the air. The air handling system may further include a heating heat exchanger for heating the air passing through the air handling system. The heating heat exchanger may be a condenser associated with the refrigeration circuit or a radiator associated with a coolant system of the motor vehicle.

The heat exchangers are typically contained within an interior of the housing while additional components of the refrigeration circuit or the coolant system of the motor vehicle are disposed exterior to the housing, thereby requiring any fluids associated with the heat exchangers to be fed through one or more openings formed in an exterior portion of the housing. Each opening formed in the housing accordingly requires sealing to prevent the ingress or egress of fluids into or out of the housing.

Figure 1:
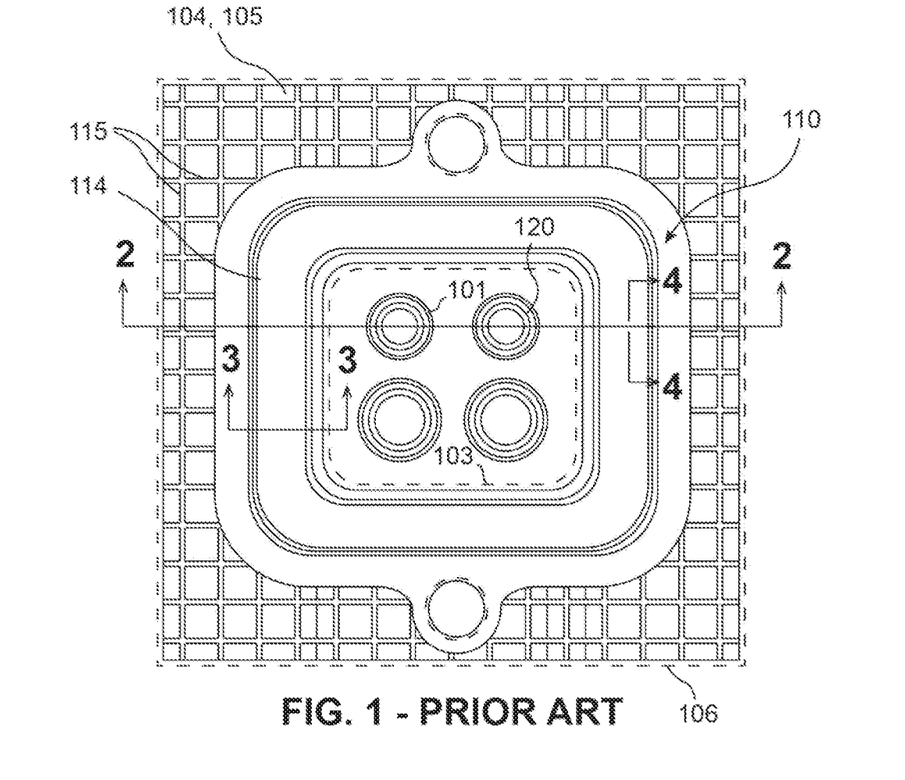
FIG. 1 is a fragmentary top plan view of a seal assembly according to the prior art including a panel, a sealing structure, and an outer wall of a housing, wherein the features of the panel are shown in phantom so structure beneath the panel is visible for clarity.
Figure 2:
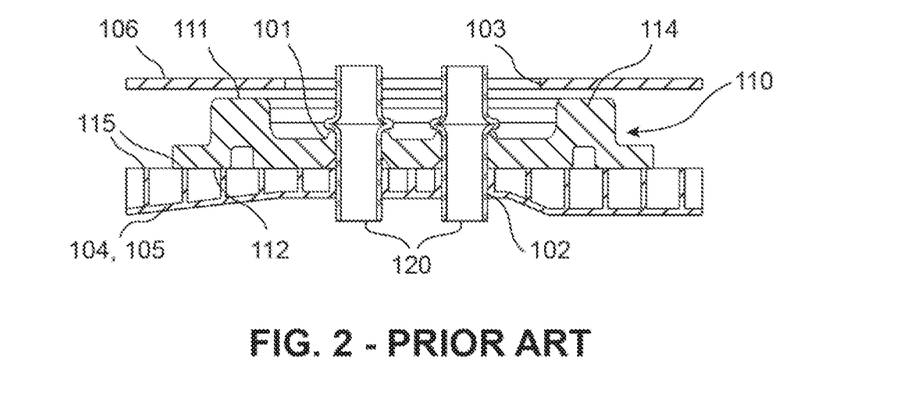
FIG. 2 is a fragmentary cross-sectional elevational view of the seal assembly of FIG. 1 prior to compression of the sealing structure between the panel and the outer wall of the housing as taken through section lines 2-2.

FIGS. 1 and 2 illustrate one exemplary sealing structure 110 for sealing one or more openings 102 formed in an outer wall 104 of a housing 105 of an air handling system. The sealing structure 110 is formed of an elastomeric material and is configured to be compressed between the outer wall 104 of the housing 105 and a panel 106 having an opening 103 to prevent an incidence of fluid entering or exiting each of the openings 102.

The sealing structure 110 is shown as having a first face 111 and an opposing second face 112. A projection 114 extends from the first face 111 of the sealing structure 110. A central region of the sealing structure 110 surrounded by the projection 114 includes a plurality of fluid ports 101 for receiving various fluid conduits 120 configured to communicate fluid to components contained within the housing 105 such as an evaporator of a refrigerant circuit associated with the air handling system. The outer wall 104 of the housing 105 includes a plurality of spaced apart ribs 115 extending away from an outer surface of the outer wall 104. The outer wall 104 of the housing 105 may include the ribs 115 to add mechanical strength to the housing 105 at selected regions thereof, to prevent formation of sink marks when manufacturing the housing 105, and to provide a substantially planar surface for engaging the sealing structure 110.

Figure 3:
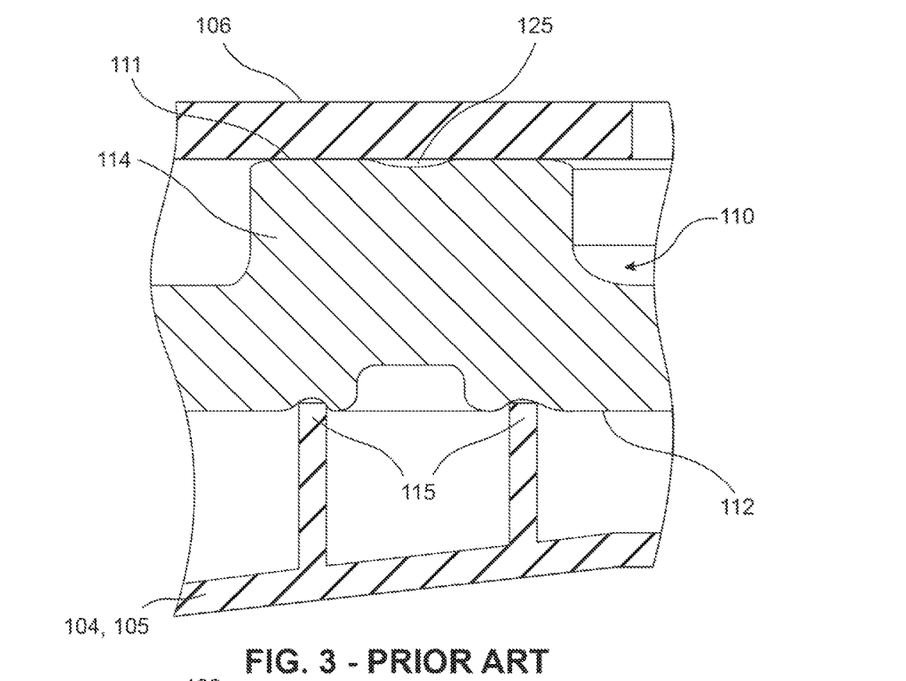
FIG. 3 is an enlarged fragmentary cross-sectional elevational view of a portion of the seal assembly of FIG. 1 following compression of the sealing structure between the panel and the outer wall of the housing taken through section lines 3-3.
Figure 4:
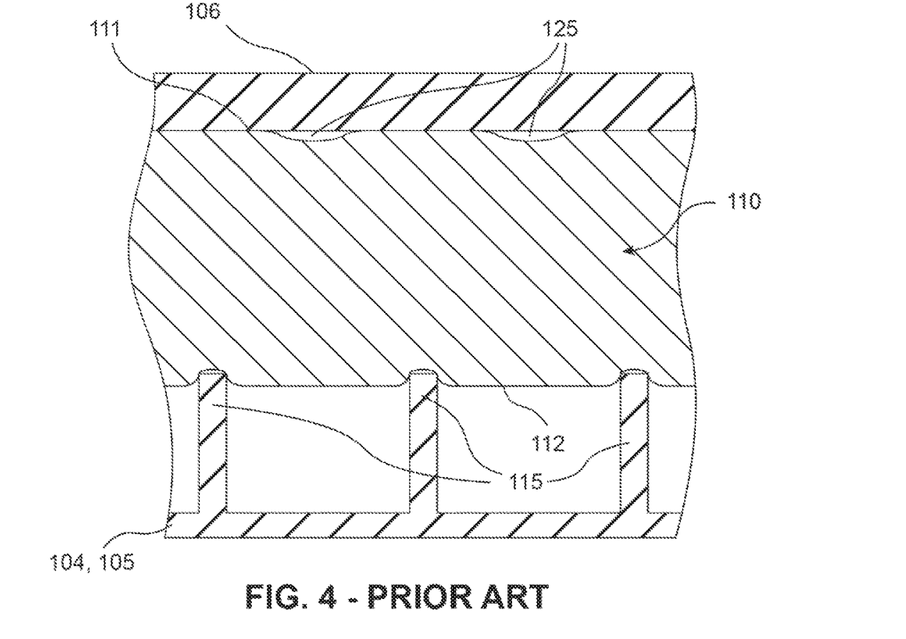
FIG. 4 is an enlarged fragmentary cross-sectional elevational view of a portion of the seal assembly of FIG. 1 following compression of the sealing structure between the panel and the outer wall of the housing taken through section lines 4-4.

FIGS. 3 and 4 illustrate one potential problem faced when employing the prior art sealing structure 110 of FIGS. 1 and 2 in conjunction with the panel 106 and the outer wall 104 of the housing 105 having the pattern of the ribs 115 formed thereon. The panel 106 includes a substantially planar face in facing relationship with the projection 114 of the first face 111 of the sealing structure 110 while the plurality of the ribs 115 form a pattern of spaced apart and projecting surfaces in facing relationship with the second face 112 of the sealing structure 110. The spacing of the ribs 115 from one another causes the second face 112 of the sealing structure 110 to encounter a plurality of spaced apart forces caused by the abutment of the ribs 115. The spaced apart forces are balanced by a substantially planar and distributed force applied by the abutment of the panel 106 to the first face 111 of the sealing structure 110. The spaced apart forces in turn cause each portion of the second face 112 of the sealing structure 110 encountering one of the ribs 115 to experience a greater force per unit of surface area than the substantially planar portion of the projection 114 of the first face 111 of the sealing structure 110 encountering the substantially planar surface of the panel 106. The ribs 115 in turn tend to deform the elastomeric sealing structure 110 by partially indenting the second face 112 of the sealing structure 110 at each abutment formed between the ribs 115 and the second face 112 of the sealing structure 110.

As shown in FIGS. 3 and 4, which illustrate cross-sectional views of the sealing structure 110 following compression of the sealing structure 110 between the ribs 115 of the outer wall 104 and the panel 106, the indenting of the second face 112 of the sealing structure 110 at each of the ribs 115 tends to cause the first face 111 of the sealing structure 110 in abutment with the panel 106 to form a corresponding indentation 125 at a position intermediate two of the ribs 115. The indentation 125 is formed as a result of a surface tension of the elastomeric sealing structure 110 causing the first face 111 thereof to take a shape corresponding to a shape taken on by the opposing second face 112 thereof. In the case illustrated in FIGS. 3 and 4, the waffle-like pattern of the ribs 115 causes a plurality of the indentations 125 to be formed in an intersecting grid-like pattern upon compression of the sealing structure 110. Such a pattern of gaps formed between the panel 106 and the sealing structure 110 by the presence of the indentations 125 may in turn lead to a decreased sealing effect achieved by compression of the sealing structure 110.

It would therefore be desirable to produce a sealing structure configured to prevent a formation of depressions at a first face of the sealing structure when the sealing structure is compressed between a planar and continuous surface engaging the first face and a plurality of spaced apart co-planar surfaces engaging an opposing second face of the sealing structure.

SUMMARY OF THE INVENTION

Compatible and attuned with the present invention, a sealing structure having improved sealing capabilities has been surprisingly discovered.

In one embodiment of the invention, a sealing structure comprises a main body having a first face and an opposing second face. The first face includes a first projection projecting therefrom including a first sealing surface spaced apart from the second face of the main body by a first distance. The first face also includes a second projection projecting away from the first sealing surface of the first projection and including a second sealing surface spaced apart from the second face of the main body by a second distance greater than the first distance.

According to another embodiment of the invention, a seal assembly comprises a panel having a surface disposed on a first plane, a plurality of spaced apart ribs with an end of each of the ribs disposed on a second plane, and a sealing structure having a first face in facing relationship with the surface of the panel and an opposing second face in facing relationship with the plurality of the spaced apart ribs. The first face includes a first projection projecting therefrom including a first sealing surface spaced apart from the second face of the main body by a first distance. The first face also includes a second projection projecting away from the first sealing surface of the first projection and including a second sealing surface spaced apart from the second face of the main body by a second distance greater than the first distance.

According to yet another embodiment of the invention, an air handling system of a motor vehicle comprises a panel having a surface disposed on a first plane, a housing having an outer wall including a plurality of spaced apart ribs extending therefrom with an end of each of the ribs disposed on a second plane, and a sealing structure having a first face in facing relationship with the surface of the panel and an opposing second face in facing relationship with the plurality of the spaced apart ribs. The first face includes a first projection projecting therefrom including a first sealing surface spaced apart from the second face of the main body by a first distance. The first face also includes a second projection projecting away from the first sealing surface of the first projection and including a second sealing surface spaced apart from the second face of the main body by a second distance greater than the first distance.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 5-8 illustrate a seal assembly 1 of an air handling system of a heating, ventilating, and air conditioning (HVAC) system of a motor vehicle. The seal assembly 1 includes a housing 5 of the air handling system, a sealing structure 20, and a panel 30.

The housing 5 includes various components associated with operation of the air handling system disposed therein. The housing 5 may for example include an evaporator (not shown) and a heater core (not shown). The evaporator may form a portion of a refrigerant circuit having components such as a compressor (not shown) disposed exterior to the housing 5. The heater core may be a condenser of the refrigerant circuit, a radiator forming a portion of a cooling system of an engine or battery of the motor vehicle, or an electrically powered device. Any combination of components associated with operation of the air handling system may be disposed within or exterior to the housing 5 without departing from the scope of the present invention.

Figure 6:
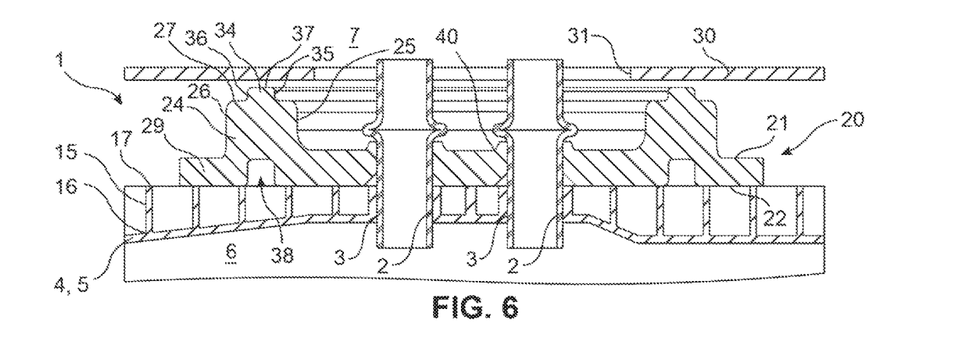
FIG. 6 is a fragmentary cross-sectional elevational view of the seal assembly of FIG. 5 prior to compression of the sealing structure between the panel and the outer wall of the housing as taken through section lines 6-6.

The housing 5 is shown as including an outer wall 4 forming a boundary between an interior 6 of the housing 5 and an exterior 7 thereof. The outer wall 4 is shown in FIG. 6 as having an irregular contour, wherein the irregular contour may be required for suitably packaging various components of the air handling system 10 within the housing 5 in a space efficient manner. The outer wall 4 of the housing 5 may be formed from any suitable rigid material such as plastic, for example.

Figure 5:
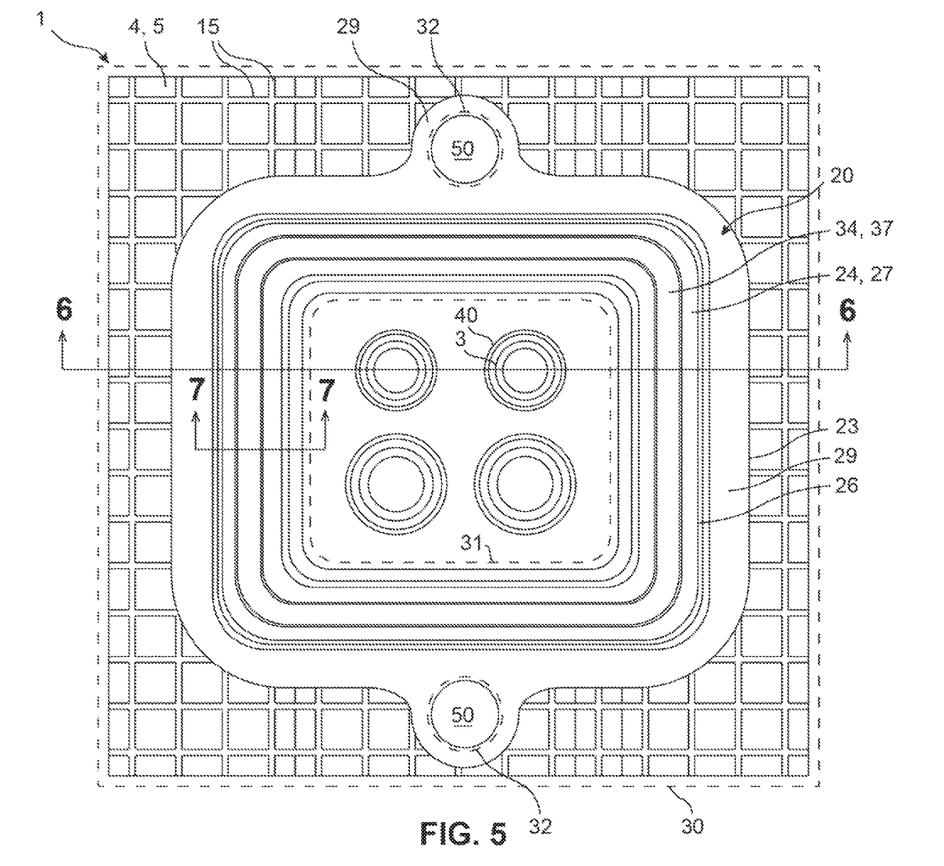
FIG. 5 is a fragmentary top plan view of a seal assembly according to an embodiment of the invention, the seal assembly including a panel, a sealing structure, and an outer wall of a housing, wherein the features of the panel are shown in phantom so structure beneath the panel is visible for clarity.

The outer wall 4 is further shown as including a plurality of spaced apart ribs 15 projecting therefrom. The ribs 15 are shown in FIG. 5 as being arranged on the outer wall 4 of the housing 5 in a grid-shaped or waffle-shaped configuration. The ribs 15 may alternatively be formed to extend in only a single direction while spaced apart from each other in a direction transverse to the direction of extension without departing from the scope of the present invention, as desired. The ribs 15 may be formed integrally with the outer wall 4 of the housing 5 during a molding operation.

Each of the ribs 15 includes a first end 16 intersecting the outer wall 4 of the housing 5 and a second end 17 spaced apart from the outer wall 4, wherein the second ends 17 of the ribs 15 are aligned along a common plane. The ribs 15 may be included on the outer wall 4 of the housing 5 to mechanically strengthen portions of the outer wall 4 while minimizing an amount of material necessary to achieve the desired mechanical strength, to reduce an incidence of sink marks during formation of the housing 5, and to form a planar surface associated with and spaced from the outer wall 4 of the housing 5 to avoid an incidence wherein components of the air handling system must be modified to correspond to or mate with the irregular contour of the outer wall 4.

The outer wall 4 of the housing 5 further includes at least one opening 2 providing fluid communication between the interior 6 of the housing 5 and the exterior 7 of the housing 5. Each of the openings 2 may be configured to receive an associated fluid conduit 3 of the air handling system 10 configured to convey a fluid between the interior 6 of the housing 5 and the exterior 7 thereof. The fluid conduit 3 may, for example, form a portion of the refrigerant circuit having the evaporator and/or the condenser and may be configured to circulate a refrigerant of the refrigerant circuit through one of the evaporator or the condenser within the interior 6 of the housing 5. The fluid conduit 3 may alternatively form a portion of a cooling system of the motor vehicle and may be configured to circulate a coolant of the cooling system through the heater core within the interior 6 of the housing 5. One skilled in the art should understand that the fluid conduit 3 may form a portion of any system associated with operation of the air handling system requiring communication of a fluid between the interior 6 and the exterior 7 of the housing 5, as desired, without departing from the scope of the present invention. Although not pictured, each of the fluid conduits 3 may further include an associated seal assembly for forming a suitable seal between the fluid conduit 3 and one of the sealing structure 20 or the outer wall 4 of the housing 5, as desired.

Additionally, although the openings 2 are described as receiving a fluid conduit 3 for communicating a fluid between the interior 6 and the exterior 7 of the housing 5, it should also be understood that each of the openings 2 may be configured to receive a portion of any component providing communication between the interior 6 and the exterior 7 of the housing 5. For example, each of the openings 2 may be configured to receive an electrical connector or cable associated with communicating electrical signals between a component disposed within the interior 6 of the housing 5 and a component disposed to the exterior 7 of the housing 5, as desired. The outer wall 4 may also include any number and configuration of the openings 2, including a single opening 2 for receiving multiple fluid conduits 3 or other communication components and multiple openings 2 having various different sizes and orientations as shown in FIG. 5.

The sealing structure 20 generally includes a main body formed from a resilient and elastically deformable material. The sealing structure 20 may be formed from a polymeric material, and more specifically an elastomer such as ethylene propylene diene monomer (EPDM) rubber. Alternative materials having the requisite characteristics of resiliency and elastic deformability may be used for forming the sealing structure 20 without departing from the scope of the present invention. The sealing structure 20 may be formed by a molding process, but any suitable material and manufacturing process may be used in forming the sealing structure 20 without departing from the scope of the present invention.

The sealing structure 20 includes a first face 21 configured to be in facing relationship with the panel 30 and an opposing second face 22 configured to be in facing relationship with the outer wall 4 of the housing 5 and the plane formed by the second ends 17 of each of the plurality of the spaced apart ribs 15. A perimeter 23 of the sealing structure 20 is shown in FIG. 5 as being substantially rectangular, but the perimeter 23 of the sealing structure 20 may have any shape without departing from the scope of the present invention, including a circular shape, an elliptical shape, and an irregular shape, as non-limiting examples, so long as the perimeter 23 of the sealing structure 20 forms a closed shape for surrounding any openings in need of sealing.

A first projection 24 having a substantially rectangular cross-sectional shape projects outwardly from the first face 21 of the sealing structure 20 and towards the panel 30. The first projection 24 follows a closed shape substantially corresponding to a shape of the perimeter 23 of the sealing structure 20. The first projection 24 includes an inner surface 25, an outer surface 26, and a distal surface 27 forming a first sealing surface of the sealing structure 20. As shown in FIG. 5, the outer surface 26 of the first projection 24 may be spaced from the perimeter 23 of the sealing structure 20 about an entirety of the perimeter 23 to cause a lip 29 to be present between the first projection 24 and the perimeter 23 of the sealing structure 20. The distal surface 27 of the first projection 24 is arranged substantially parallel to each of the plane formed by the second ends 17 of the spaced apart ribs 15 and a plane formed by the substantially planar panel 30. The distal surface 27 of the first projection 24 is spaced apart from the second face 22 of the sealing structure 20 by a first distance.

A second projection 34 having a substantially rectangular cross-sectional shape projects away from the distal surface 27 of the first projection 24 and towards the panel 30. The second projection 34 may be disposed on a central portion of the distal surface 27 equally spaced from each of the inner surface 25 of the first projection 24 formed to a first side of the second projection 34 and the outer surface 26 of the first projection 24 formed to a second side of the second projection 34. The second projection 34 includes an inner surface 35, an outer surface 36, and a distal surface 37 forming a second sealing surface of the sealing structure 20. The distal surface 37 of the second projection 34 is arranged parallel to the distal surface 27 of the first projection 34 and is spaced from the second face 22 of the sealing structure 20 by a second distance greater than the first distance. The second distance may be about 110%-120% greater than the first distance, as one non-limiting example.

The first projection 24 and the second projection 34 are described as having substantially rectangular cross-sectional shapes, but alternative cross-sectional shapes may be utilized without departing from the scope of the present invention so long as a sealing surface of the first projection 24 is spaced apart from the second face 22 of the sealing structure 20 by a smaller distance than a sealing surface of the second projection 34. For example, the first projection 24 may include a pair of fillets having a desired radius of curvature formed between the distal surface 27 thereof and each of the inner surface 25 and the outer surface 26 thereof. The second projection 34 may similarly include a pair of fillets having a desired radius of curvature formed between the distal surface 37 thereof and each of the inner surface 35 and the outer surface 36 thereof. Alternatively, the first projection 24 and the second projection 34 may each have a substantially semi-circular or semi-elliptical shape, wherein the second projection 34 includes a smaller diameter or width in comparison to the first projection 24 to cause the second projection 34 to project away from the distal surface 27 of the first projection 24. In such a circumstance, the distal surface 27 of the first projection 24 may be present at an intersection of an outer surface of the first projection 24 with an outer surface of the second projection 34 while the distal surface 37 of the second projection 34 may form an apex of the semi-circular or semi-elliptical shape of the second projection 34. In other embodiments, one or both of the inner surface 25 and the outer surface 26 of the first projection 24 may be arranged to be angled at a non-perpendicular angle with respect to the distal surface 27 thereof to form a first projection 24 having a substantially trapezoidal shape. Similarly, one or both of the inner surface 35 and the outer surface 36 of the second projection 34 may be angled at a non-perpendicular angle with respect to the distal surface 37 thereof to form a second projection 34 having a substantially trapezoidal shape. The sealing structure 20 may additionally include any combination of the shapes disclosed hereinabove for forming the first projection 24 and the second projection 34, such as the first projection 24 having a rectangular cross-sectional shape and the second projection 34 having a semi-elliptical cross-sectional shape, as one non-limiting example.

A recess 38 is formed in the second face 22 of the sealing structure 20 in substantial alignment with a center of each of the first projection 24 and the second projection 34. The recess 38 accordingly follows a shape that is substantially identical to the shape of each of the first projection 24, the second projection 34, and the perimeter 23 of the sealing structure 20. The inclusion of the recess 38 allows for the amount of material used to form the sealing structure 20 to be minimized.

A central region of the sealing structure 20 surrounded by the first projection 24 includes a plurality of fluid ports 40 for receiving one of the fluid conduits 3. The sealing structure 20 is shown as having four of the fluid ports 40, but the sealing structure 20 may have any number of the fluid ports 40 without departing from the scope of the present invention. The four fluid ports 40 may for example include a pair of inlet ports and a pair of outlet ports, wherein a first inlet port and a first outlet port are associated with communicating a first fluid (such as a refrigerant) between the interior 6 and the exterior 7 of the housing 5 while a second inlet port and a second outlet port are associated with communicating a second fluid (such as a coolant) between the interior 6 and the exterior 7 of the housing 5. As mentioned hereinabove, each of the fluid conduits 3 may be sealed to the sealing structure 20 using any known form of seal assembly, as desired, without departing from the scope of the present invention.

The lip 29 of the sealing structure 20 is shown as including a pair of coupling apertures 50 therein. Although two coupling apertures 50 are shown, it is understood that any number and arrangement of the coupling apertures 50 necessary for coupling the sealing structure 20 to each of the panel 30 and the housing 5 may be employed without departing from the scope of the present invention. Each of the coupling apertures 50 may be positioned to be in alignment with a corresponding aperture (not shown) formed the outer wall 4 of the housing 5 and a corresponding aperture 32 formed in the panel 30. Each of the coupling apertures 50 is then configured to receive a fastening device for coupling the sealing structure 20 to each of the housing 5 and the panel 30 and then compressing the sealing structure 20 between the housing 5 and the panel 30. For example, one end of a threaded fastener such as a bolt may be fed through one of the apertures of the housing 5, one of the coupling apertures 50 of the sealing structure 20, and one of the apertures 32 of the panel 30. The end of the bolt may then receive another complimentary threaded component such as a nut. A turning of the nut relative to the bolt in turn draws the panel 30 towards the outer wall 4 of the housing 5, thereby compressing the sealing structure 20 between the panel 30 and the housing 5.

Although a nut and bolt combination has been described, it should be understood by one skilled in the art that any device or assembly suitable for drawing the panel 30 towards the outer wall 4 of the housing 5 for compressing the sealing structure 20 therebetween may be used without departing from the scope of the present invention.

The panel 30 includes an opening 31 formed therein having substantially the same shape as the perimeter 23 of the sealing structure 20. The opening 31 is indented relative to the perimeter 23 of the sealing structure 20 to cause an entirety of the first projection 24 of the sealing structure 20 to be disposed between the panel 30 and a portion of the outer wall 104 of the housing 105 surrounding each of the openings 2. The panel 30 may be formed from a piece of sheet metal forming a portion of a front dash area of the motor vehicle. However, the panel 30 may be formed from any rigid material and may be formed by any substantially planar surface of the motor vehicle suitable for engaging and compressing the sealing structure 20 towards the outer wall 4 of the housing 5.

In use, the substantially planar second face 22 of the sealing structure 20 is placed in abutment with the plane formed by the second ends 17 of the spaced apart ribs 15 while each of the coupling apertures 50 is placed in alignment with a corresponding aperture formed in the outer wall 4 of the housing 5 to properly locate the sealing structure 20. The panel 30 is brought adjacent the distal surface 37 of the second projection 34 forming a distal surface of the first face 21 of the sealing structure 20. As shown in FIG. 6, each of the fluid conduits 3 is received in one of the fluid ports 40 of the sealing structure 20 and a corresponding one of the openings 2 formed in the outer wall 4 of the housing 5 to fluidly couple a component (not shown) disposed within the interior 6 of the housing 5 to a component (not shown) disposed to the exterior 7 of the housing 5.

Once the seal assembly 1 is in the configuration shown in FIG. 6 wherein the panel 30 is disposed adjacent the first face 21 of the sealing structure 20, the panel 30 is drawn towards the outer wall 4 of the housing 5 to compress the sealing structure 20 between the panel 30 and the plane formed by the ends 17 of the ribs 15. As explained hereinabove, the drawing of the panel 30 towards the housing 5 may be accomplished by a threaded fastener or the like received through each of the housing 5, the sealing structure 20, and the panel 30.

Figure 7:
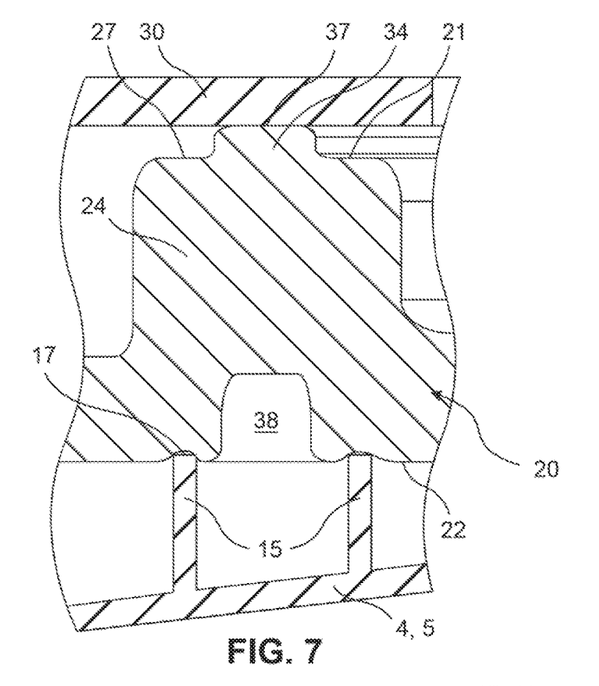
FIG. 7 is an enlarged fragmentary cross-sectional elevational view of a portion of the seal assembly of FIG. 5 following partial compression of the sealing structure between the panel and the outer wall of the housing as taken through section lines 7-7.

With reference now to FIG. 7, the drawing of the panel 30 towards the housing 5 causes the panel 30 to first engage the distal surface 37 of the second projection 34 while the second face 22 of the sealing structure 20 remains in contact with the plane formed by the ribs 15. Further drawing of the panel 30 towards the housing 5 causes the sealing structure 20 to begin to elastically compress and reduce in a thickness direction measured between the first face 21 and the second face 22 of the sealing structure 20. As the sealing structure 20 is compressed between the panel 30 and the ends 17 of the plurality of the ribs 15, the second projection 34 is compressed in a manner drawing the distal surface 37 of the second projection 34 closer to the distal surface 27 of the first projection 24. At this point, the distal surface 37 of the second projection 34 forming the first sealing surface of the sealing structure 20 is displaced from the second sealing surface of the sealing structure 20 formed by the distal surface 27 of the first projection 24.

Continued drawing of the panel 30 towards the housing 5 causes the second projection 34 to compress to an extent wherein the distal surface 37 of the second projection 34 is brought into alignment with the distal surface 27 of the first projection 24 to form one continuous and common sealing surface including the first sealing surface and the second sealing surface along the portions of the first face 21 of the sealing structure 20 having the first and second projections 24, 34. The sealing structure 20 is then further compressed between the panel 30 and the housing 5 to cause the common sealing surface formed by the distal surfaces 27, 37 of the first and second projections 24, 34 to be brought closer to the second face 22 of the sealing structure 20.

Figure 8:
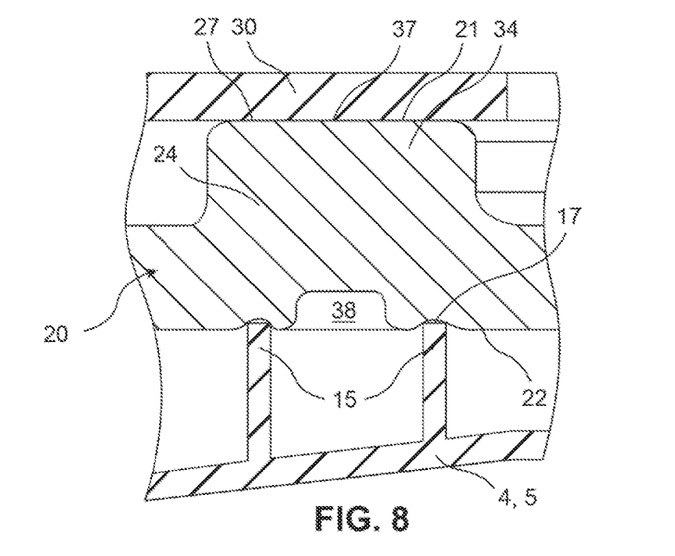
FIG. 8 is an enlarged fragmentary cross-sectional elevational view of the portion of the seal assembly of FIG. 7 following compression of the sealing structure between the panel and the outer wall of the housing.

FIG. 8 illustrates the seal assembly 1 when the panel 30 is spaced a desired distance from the plane formed by the ends 17 of the ribs 15 and when the sealing structure 20 is compressed to a state wherein the distal surface 27 of the first projection 24 and the distal surface 37 of the second projection 34 are arranged substantially co-planar to each other while engaging the planar surface formed by the panel 30. When in the fully compressed condition, the surface of the panel 30 engaging the sealing structure 20 is spaced from the plane defined by the ends 17 of the ribs 15 by a third distance, wherein the third distance is smaller than the first distance the distal surface 27 of the first projection 24 is spaced from the second face 22 of the sealing structure 20 prior to compression of the sealing structure 20. In other words, the common and continuous sealing surface formed by the cooperation of the co-planar distal surfaces 27, 37 is compressed to an extent wherein the common sealing surface is spaced closer to the ends 17 of the plurality of the ribs 15 than is the distal surface 27 of the first projection 24 prior to the compression of the sealing structure 20.

The common sealing surface formed by the cooperation of the distal surfaces 27, 37 is beneficially devoid of depressions or indentations that could potentially compromise the integrity of the seal formed between the sealing structure 20 and the panel 30. The lack of depressions or indentations is caused by the presence of the second projection 34 extending from the distal surface 27 of the first projection 24. The stacking of the first projection 24 and the second projection 34 in the thickness direction of the sealing structure 20 causes a maximum thickness of the sealing structure 20 between the distal surface 37 of the second projection 34 and the second face 22 of the sealing structure 20 engaging the plane formed by the ribs 15 to be increased relative a sealing structure devoid of the second projection 34. As the panel 30 is drawn closer to the plane formed by the ribs 15, a distance the distal surface 37 of the second projection 34 must move from an original position to a fully compressed position is increased relative to a distance the distal surface 27 of the first projection 24 must move from an original position to a fully compressed position.

Thus, a portion of the sealing structure 20 having the first projection 24 and the second projection 34 stacked in the thickness direction of the sealing structure 20 must undergo a greater amount of strain to achieve the fully compressed position in comparison to those portions of the sealing structure 20 devoid of the second projection 34. The increased strain experienced by the portion of the sealing structure 20 having the second projection 34 and the first projection 24 tends to cause the common sealing surface formed by the cooperation of the distal surfaces 27, 37 to contort to the planar contour of the panel 30, thereby eliminating an incidence of buckling or folding of the sealing structure 20 along the first face 21 thereof that could compromise the sealing capabilities of the sealing structure 20.

Although the seal assembly 1 has been disclosed with reference to the sealing of a portion of an air handling system, it should be understood that the sealing structure 20 disclosed herein can be adapted for use in any form of seal assembly including the engagement of a planar surface with one face of the sealing structure and the engagement of a plurality of spaced apart surfaces with another face of the sealing structure without departing from the scope of the present invention. The seal assembly 1 may be adapted for use in any form of structure or assembly in need of such a seal.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A sealing structure engaging a plurality of spaced apart ribs projecting from an outer wall of a housing of an air handling system, the sealing structure comprising:
   a main body having a first face and an opposing second face, the first face including a first projection projecting therefrom including a first sealing surface spaced apart from the second face of the main body by a first distance, the first face further including a second projection projecting away from the first sealing surface of the first projection and including a second sealing surface spaced apart from the second face of the main body by a second distance greater than the first distance, wherein the second face is substantially planar and engages the plurality of the spaced apart ribs projecting from the outer wall of the housing.

2. The sealing structure of claim 1, wherein the main body is formed from an elastically deformable material.

3. The sealing structure of claim 1, wherein the first sealing surface and the second sealing surface are arranged substantially parallel to the second face of the main body.

4. The sealing structure of claim 1, wherein the second projection is equally spaced from a first surface of the first projection and an opposing second surface of the first projection in a direction parallel with the second face of the main body.

5. The sealing structure of claim 1, wherein the first projection and the second projection each have a substantially rectangular cross-sectional shape.

6. The sealing structure of claim 1, wherein the second face of the main body includes a recess formed in alignment with the second projection.

7. The sealing structure of claim 1, wherein the first projection extends adjacent a perimeter of the main body, the perimeter of the main body forming a closed shape.

8. The sealing structure of claim 7, wherein the first projection surrounds at least one fluid port providing fluid communication between the first face and the second face of the main body.

9. A seal assembly comprising:
   a panel having a surface disposed on a first plane;
   a plurality of spaced apart ribs, an end of each of the ribs disposed on a second plane; and
   a sealing structure having a first face in facing relationship with the surface of the panel and an opposing second face in facing relationship with the plurality of the spaced apart ribs, the first face including a first projection projecting therefrom including a first sealing surface spaced apart from the second face of the main body by a first distance, the first face further including a second projection projecting away from the first sealing surface of the first projection and including a second sealing surface spaced apart from the second face of the main body by a second distance greater than the first distance.

10. The seal assembly of claim 9, wherein the sealing structure is formed of an elastically deformable material.

11. The seal assembly of claim 9, wherein the second face of the sealing structure, the first sealing surface of the first projection, and the second sealing surface of the second projection are substantially planar and arranged substantially parallel to each other.

12. The seal assembly of claim 9, wherein the first projection and the second projection each have a substantially rectangular cross-sectional shape.

13. The seal assembly of claim 9, wherein the second projection is equally spaced from a first surface of the first projection and an opposing second surface of the first projection.

14. The seal assembly of claim 9, wherein the second face of the sealing structure includes a recess formed in alignment with the second projection.

15. The seal assembly of claim 9, wherein the first sealing surface of the first projection, the second sealing surface of the second projection, and the surface of the panel are arranged co-planar when the surface of the panel is moved to a position spaced from the second face of the sealing structure by a third distance smaller than the first distance.

16. The seal assembly of claim 15, wherein a first portion of the sealing structure disposed between the second sealing surface of the second projection and the second face of the sealing structure experiences a greater degree of strain than a second portion of the sealing structure disposed between the first sealing surface of the first projection and the second face of the sealing structure when the panel is spaced from the second face of the sealing structure by the third distance.

17. The seal assembly of claim 9, wherein the first projection extends adjacent a perimeter of the sealing structure, the perimeter of the sealing structure forming a closed shape.

18. The seal assembly of claim 17, wherein the first projection surrounds at least one fluid port providing fluid communication between the first face and the second face of the sealing structure.

19. An air handling system of a motor vehicle comprising:
a panel having a surface disposed on a first plane;
a housing having an outer wall, the outer wall including a plurality of spaced apart ribs extending therefrom, an end of each of the ribs disposed on a second plane; and
a sealing structure having a first face in facing relationship with the surface of the panel and an opposing second face in facing relationship with the plurality of the spaced apart ribs, the first face including a first projection projecting therefrom including a first sealing surface spaced apart from the second face of the main body by a first distance, the first face also including a second projection projecting away from the first sealing surface of the first projection and including a second sealing surface spaced apart from the second face of the main body by a second distance greater than the first distance.

* * * * *